P. S. DOUGLAS-HAMILTON.
DEVICE FOR INDICATING THE INTENDED MOVEMENTS OF VEHICLES.
APPLICATION FILED DEC. 31, 1907.
912,831.
Patented Feb. 16, 1909.
2 SHEETS—SHEET 1.
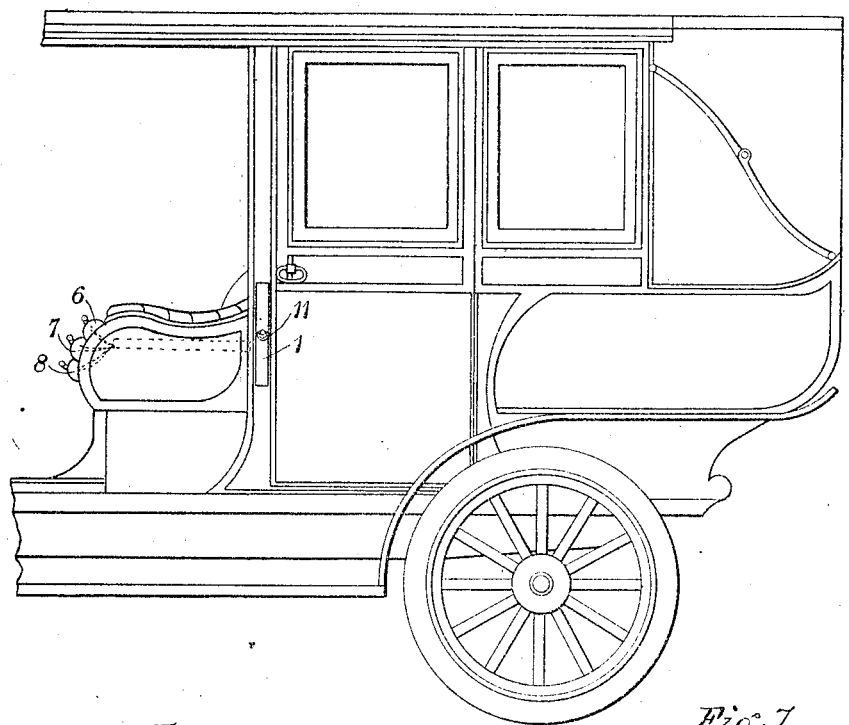
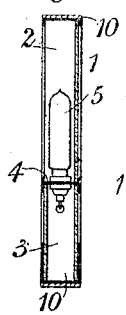
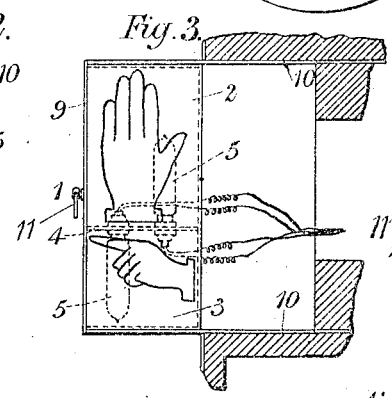
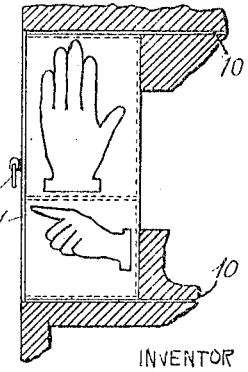
WITNESSES
William Abbe
Paul N. Blair
INVENTOR
Percy Seymour Douglas-Hamilton
BY
Howson and Howson
ATTORNEYS P. S. DOUGLAS-HAMILTON.
DEVICE FOR INDICATING THE INTENDED MOVEMENTS OF VEHICLES.
APPLICATION FILED DEC. 31, 1907.
912,831.
Patented Feb. 16, 1909.
2 SHEETS—SHEET 2.
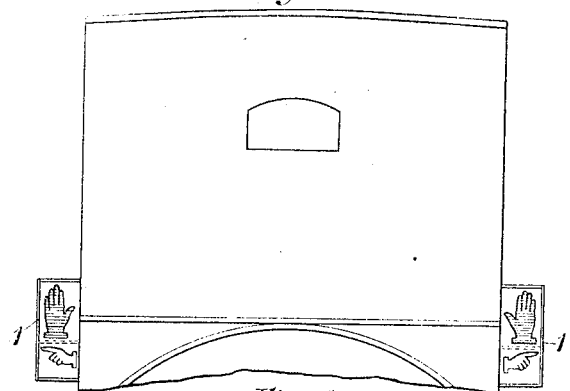
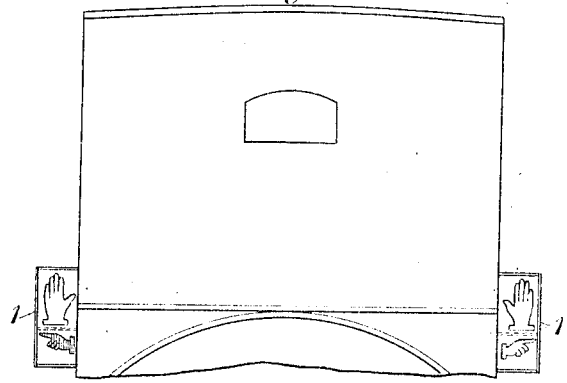
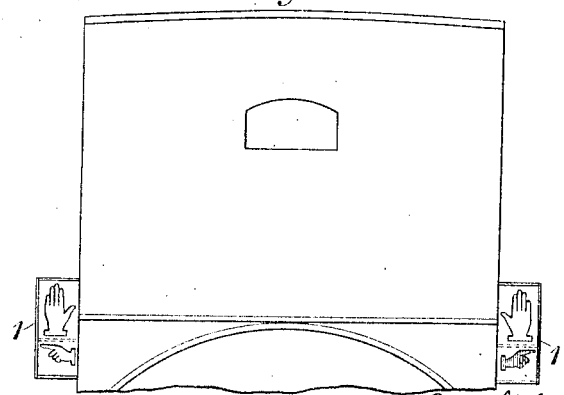

UNITED STATES PATENT OFFICE.

PERCY SEYMOUR DOUGLAS-HAMILTON, OF QUEEN'S GATE GARDENS, LONDON, ENGLAND.

DEVICE FOR INDICATING THE INTENDED MOVEMENTS OF VEHICLES.

No. 912,831.

Specification of Letters Patent.

Patented Feb. 16, 1909.

Application filed December 31, 1907. Serial No. 409,843.

*To all whom it may concern:*

Be it known that I, PERCY SEYMOUR DOUGLAS-HAMILTON, a subject of the King of Great Britain and Ireland, of 6 Queen's Gate Gardens, London, England, gentleman, and whose post-office address is 6 Queen's Gate Gardens, London, aforesaid, have invented new and useful Improvements in Devices for Indicating the Intended Movements of Vehicles, of which the following is a specification.

My invention relates to devices for use on vehicles for indicating the intended movements, or stoppages, of such vehicles, the said devices being of the class which are illuminated for use at night-time, and being especially intended for use with motor road vehicles, although they can be used with other road vehicles.

The object of my invention is to provide devices which are simple and economical in construction and convenient in use and especially devices which, at day-time, or when otherwise out of use, can be pushed back into recesses in the body of the vehicle so that no part of the devices will then project from the vehicle which then has the general appearance of a vehicle unprovided with such devices, while at night-time the devices can be very readily brought into position for use.

According to my invention I provide boxes, casings, or supports, carrying representations of hands, or equivalent devices, (which I will hereinafter refer to as hands) which are capable of being illuminated to indicate the direction to be taken by the vehicle.

The accompanying drawing represents an arrangement in accordance with my invention, Figure 1 showing a car with the indicating apparatus applied thereto. Fig. 2 is a section of the box containing the indicating devices. Fig. 3 is a view showing the recess into which the box or casing is depressed. Figs. 4, 5 and 6 show the apparatus withdrawn and making various indications; Fig. 7 is a view similar to Fig. 3 with the box or casing depressed within the recess.

1 is a box divided into two compartments (2 and 3) by a partition 4. In each compartment is an electric lamp 5, the conductors to which lead to switches 6, 7 and 8, by conductors which will allow of the movement of the boxes, or through conductors completed by contact pieces on the boxes and vehicle respectively, which complete the circuits when the boxes are withdrawn. There are two such boxes in the arrangement shown. The switch 6 completes the circuit to the lamps in the compartment 2 of each box, the switch 7 completes the circuit to the lamp in the compartment 3 on the right-hand side of the vehicle, and the switch 8 completes the circuit to the lamp in the compartment 4 on the left-hand side of the vehicle. The sides of the compartments of the boxes have openings (preferably the shape of hands as shown) cut in them, the compartments 2 having a representation of a spread-out open hand cut through the rear side, and the compartments 3 having a representation of a pointing hand which is cut through both sides. Each box fits into a recess in the vehicle so that both boxes can be withdrawn at night-time and returned into the recesses when not required in the day-time (Fig. 7). The end 9 of each box is made of a character to correspond with the part of the vehicle in which the opening to the recess is made, and of a shape to exactly fill such opening, so that, when the box is pushed back into the recess, the said end forms, to all appearance, a continuation of the body of the vehicle.

Behind the cut-out portions of the front and rear sides of the boxes, red, or other colored, glass, or the like, may be secured.

The representations of the hands may however be made in any other suitable way; for example, the sides of the box may be made of red, or other, glass obscured by paint, or otherwise, at all parts but those which represent the hands.

10 are extensions from the box to act as supports for the box when withdrawn.

Rings 11, or the like, may be used for facility in withdrawing the boxes from the recesses.

When the indicator is to be used, the boxes 1 are withdrawn from the recesses in the vehicle so as to sufficiently project from the vehicle, as shown in Figs. 4, 5 and 6, any suitable means being provided for stopping them when sufficiently withdrawn, and keeping them in position. When the driver intends running say to the right, he operates the switch 7 which puts on current to the lamp for illuminating the horizontal pointing hand in the box on the right-hand side of the vehicle, as shown in Fig. 6. When he intends turning to the left, he operates the switch 8 which puts on current for illuminating the horizontal pointing hand in the box on the left-hand side of the vehicle, as shown in Fig. 5. When he intends stopping, he operates the switch 6 which puts on current to the lamps for illuminating the vertical spread-out hands in both boxes, as shown in Fig. 4.

It is to be understood that I may use only one box if desired for indicating stopping, or both stopping and turning in one direction, and that the stopping indication may be only in one of the boxes where two are used but generally I prefer the arrangement described and shown.

I claim as my invention:

1. An automobile or the like road vehicle having a recess in the side of the body of the vehicle, a direction indicator adapted to be moved into said recess and present its outer face substantially flush with the surface of the vehicle when the device is out of use, said indicator comprising a movable casing with transparent faces and direction indicating symbols, an electric lamp within said casing, switch means therefor located conveniently to the driver's seat and electrical connections from said switches to the lamp, substantially as described.

2. An automobile or the like road vehicle having a recess in the side of the body of the vehicle, a direction indicator adapted to be moved into said recess and present its outer face substantially flush with the surface of the vehicle when the device is out of use, said indicator comprising a movable casing having separate compartments and transparent faces therefor, different direction indicating symbols in said compartments, a lamp for each compartment, switch means convenient to the driver's seat for controlling each lamp and electrical connections from said switch means and the lamps, substantially as described.

In testimony whereof I have signed my name to this specification in the presence of two subscribing witnesses.

PERCY SEYMOUR DOUGLAS-HAMILTON.

Witnesses:
H. D. JAMESON,
F. L. RAND.